United States Patent
Tsyrganovich (10) Patent No.: US 7,139,037 B1
(45) Date of Patent: Nov. 21, 2006

(54) CIRCLE CORRECTION IN DIGITAL LOW-PASS FILTER

(75) Inventor: Anatoliy V. Tsyrganovich, San Jose, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 08/937,877

(22) Filed: Sep. 29, 1997

(51) Int. Cl.
| | |
|---|---|
| H04N 9/64 | (2006.01) |
| H04N 5/21 | (2006.01) |
| H04N 9/73 | (2006.01) |
| G06F 17/10 | (2006.01) |

(52) U.S. Cl. .................. 348/650; 348/649; 348/651; 708/301

(58) Field of Classification Search ............... 348/498, 348/518, 519, 654, 605, 699, 649, 650, 651, 348/665; 327/152, 153, 158, 161; 364/720; 708/301; H04N 7/00, 11/00, 9/64
See application file for complete search history.

(56) References Cited

U.S. PATENT DOCUMENTS

| | | | | |
|---|---|---|---|---|
| 3,688,021 A | * | 8/1972 | Ekstrand | .............. 348/654 |
| 4,091,411 A | * | 5/1978 | Sanada et al. | ............. 348/605 |
| 4,197,556 A | * | 4/1980 | Isono et al. | ................. 348/649 |
| 4,644,389 A | * | 2/1987 | Nakagawa et al. | ......... 348/640 |
| 4,714,954 A | * | 12/1987 | Yoshinaka | .................. 348/498 |
| 4,766,495 A | * | 8/1988 | Kobayashi et al. | ......... 348/513 |
| 4,939,572 A | * | 7/1990 | Kosaka et al. | ............. 348/489 |
| 5,355,179 A | * | 10/1994 | Ciardi et al. | ................. 348/654 |
| 5,381,238 A | * | 1/1995 | Namiki et al. | ................. 356/13 |

* cited by examiner

Primary Examiner—Chris Kelley
Assistant Examiner—Reuben M. Brown
(74) Attorney, Agent, or Firm—Imperium Patent Works; Darien K. Wallace; T. Lester Wallace (57) ABSTRACT

A filter circuit is provided which has a filtered input and an unfiltered input. The filtered input passes through delay elements to coefficient circuitry. The unfiltered input passes to the coefficient circuitry without passing through the delay elements. In this manner, an unfiltered offset can be added to the filtered output. This filter is especially useful when the filtered value is in phase representation form; for example, when the filter value is a hue value encoded as a phase.

26 Claims, 8 Drawing Sheets

CIRCLE CORRECTION IN DIGITAL LOW-PASS FILTER

BACKGROUND OF THE INVENTION

The present invention relates to digital filters, especially digital low-pass filters for use with graphics encoders for video signals.

Figure 1:
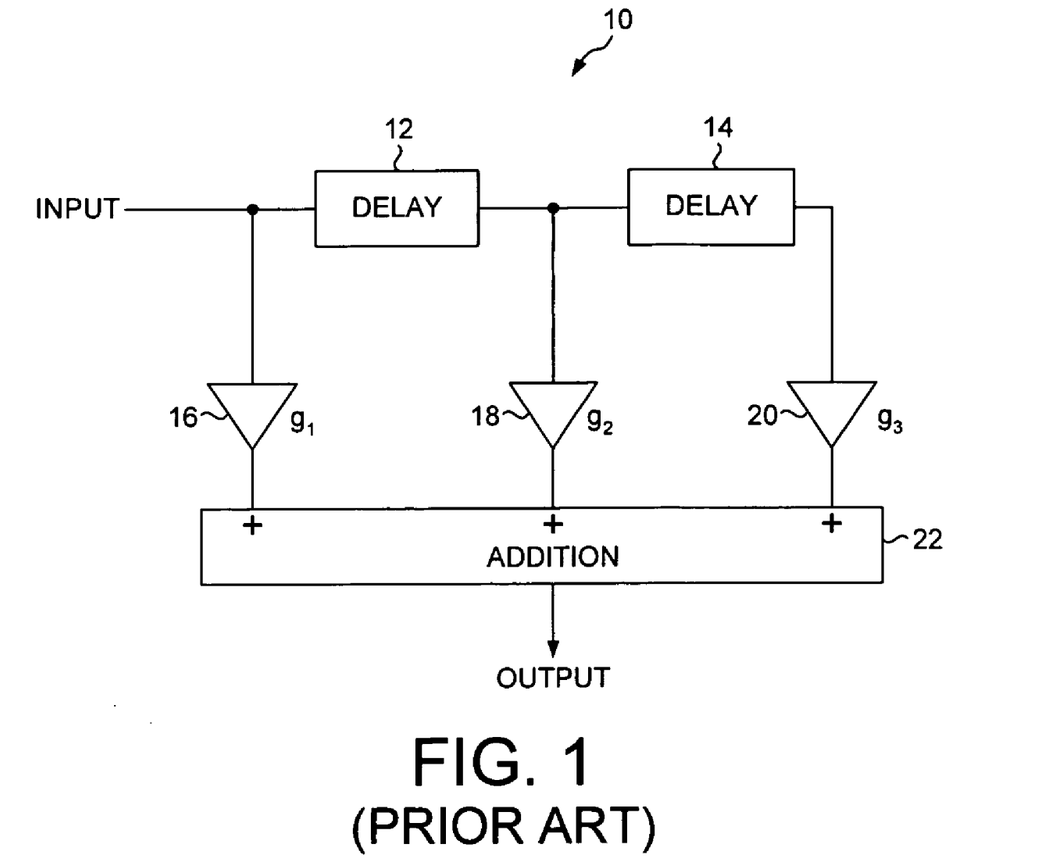
FIG. 1 is a diagram of a prior art digital filter.

FIG. 1 is a diagram of an example of a prior art digital filter 10. The digital filter 10 uses delay elements 12, 14, 16, 18 and 20, and summer 22. Such a digital filter produces an output defined by the equation output($n$)=$g_1$input($n$)+$g_2$input($n$−1)+$g_3$input($n$−2)

Any input is filtered in this prior art digital filter. It is desired to have an improved digital filter system.

SUMMARY OF THE PREFERRED EMBODIMENT

As described in the book "Video Demystified," Second Edition, by Keith Jack, incorporated herein by reference, digital video encoders typically use digital filters. In video encoders, the video pixel data can be defined in the Hue-Saturation-Intensity color space. The intensity corresponds to the black and white picture; the hue indicates the color, such as red or blue; and the saturation is an indication of the value of the color. A color with the same hue can have different saturation values; the same hue can range from pink to a dark red.

The most common television standards are the National Television Standards Committee (NTSC) standard used in the United States and the Phase Alternation Line (PAL) standard used in many European countries. Both of these standards derive from earlier standards in which all of the picture data is used to encode the black and white picture or luminance.

The color (hue and saturation) information is encoded onto a chrominance subcarrier about a subcarrier frequency within the picture data bandwidth. The chrominance subcarrier has a phase which encodes hue information and an amplitude which encodes saturation information.

In some situations, as described in the co-pending application of the same inventor entitled "Reduction of Color Transition Distortions in NTSC/PAL Encoder," now U.S. Pat. No. 5,995,164, incorporated herein by reference, it is beneficial to use the hue phase change between the pixel values which gives the minimum absolute value of the phase change. For example, a phase change from $1/4\pi$ to $7/4\pi$ produces a $3/2\pi$ phase change. By using the phase change from $1/4\pi$ to $−1/4\pi$ instead, the change in the hue is only $−1/2\pi$ and the color distortion between pixels is reduced.

A difficulty with this method concerns a hue signal simply reconstructed using the modified phase values. A large number of consecutive positive or negative modified phase change values can be produced. This would require a large number of bits for the reconstructed hue.

One embodiment of the present invention is the use of a correction signal which is a $2\pi n$ offset, n being an integer, added to the hue signals in order to keep the hue signals bounded. The $2\pi n$ correction signal does not affect the value of hue, since the hue values are encoded as a phase.

Another embodiment of the present invention is the use of a special filter for the hue signal that does not filter the $2\pi n$ correction components. A normal filter would filter the $2\pi$ step change component of the correction signal and produce spurious phase (color) values in the output video signal.

Another embodiment of the present invention is a digital filter that includes an unfiltered correction. In a preferred embodiment, the unfiltered correction is added by a summer in coefficient circuitry of the filter, and does not pass through an input delay line of the digital filter.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE PREFERRED EMBODIMENT

Figure 2:
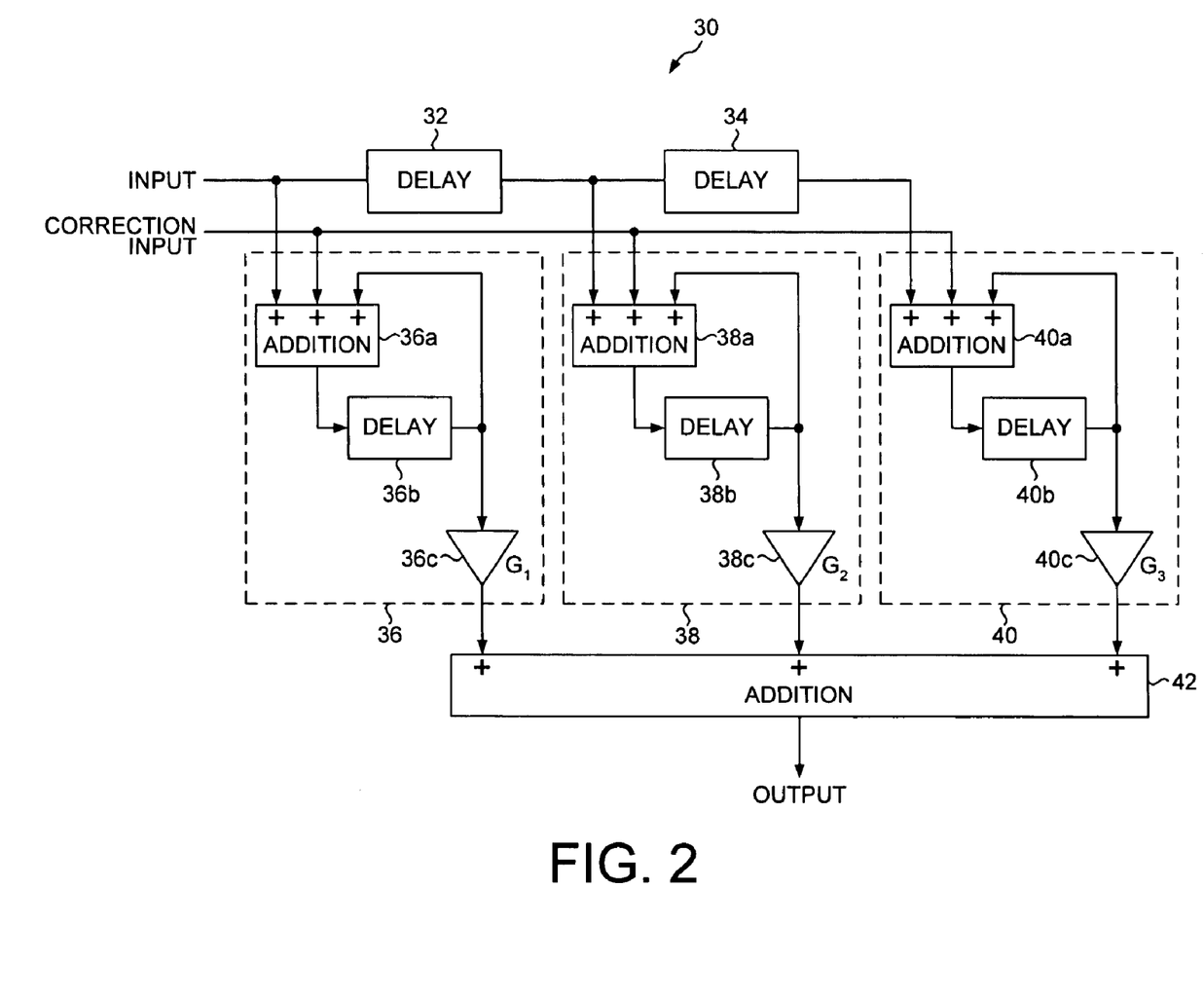
FIG. 2 is a diagram of a digital filter of the present invention using an unfiltered correction input.

FIG. 2 is a diagram of the filter 30 of the present invention. The filter 30 includes an input delay line composed of digital delays 32 and 34. The signal from the delay lines goes to the coefficient circuitry 36, 38 and 40. Additionally, a correction input along lines 42 is sent to the coefficient circuitry 36, 38 and 40. The correction input on line 42 is not sent through the delays 32 or 34. In the correction circuitry, an adder 36a, 38a and 40a adds the correction input together with the input from the delay line. Additionally, since the correction input and main input are differential inputs, the output of the addition circuitry 36a, 38a and 40a is feedback after a delay as an input to the addition circuitry. The output of the delay 36b, 38b, and 40b is also sent to the gain amplifier 36c, 38c and 40c. The output of coefficient circuitry 36, 38 and 40 is sent to adder 42, which produces the filter output. Note that, since the correction input along line 42 is not sent through any of the delays 32 or 34, the correction input is not filtered. The correction input, however, is converted from a differential input and given a gain equal to ($G_1$+$G_2$+$G_3$). By sending the correction input through the adders 36a, 38a and 40a, the correction input is given with the same gain as the delayed input. The circuitry could also be set up such that the gains $G_1$, $G_2$ and $G_3$ can be modified and the correction input need not be changed.

Figure 4:
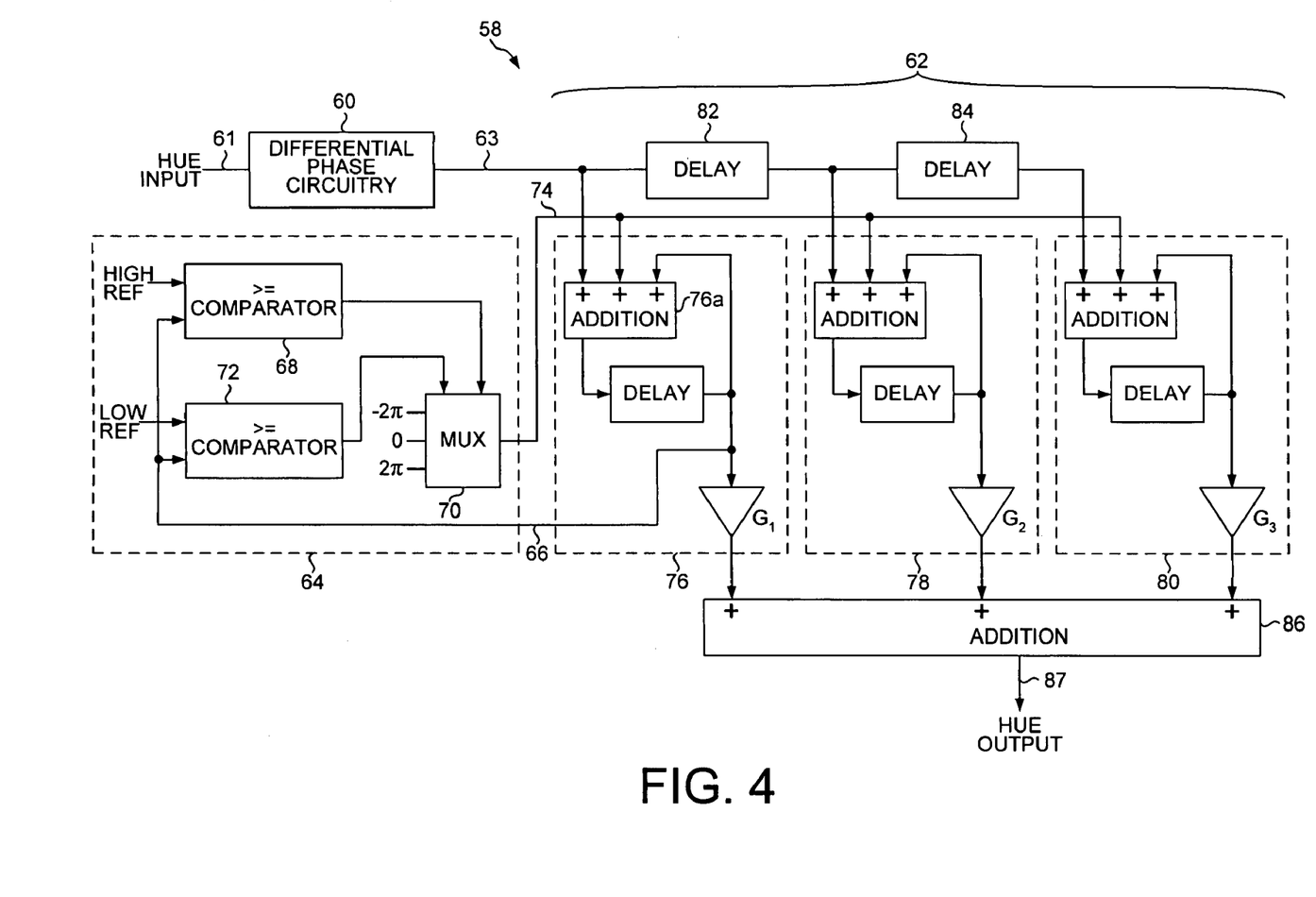
FIG. 4 is a diagram of the filter of the present invention for use with the encoder of FIG. 3.
Figure 5:
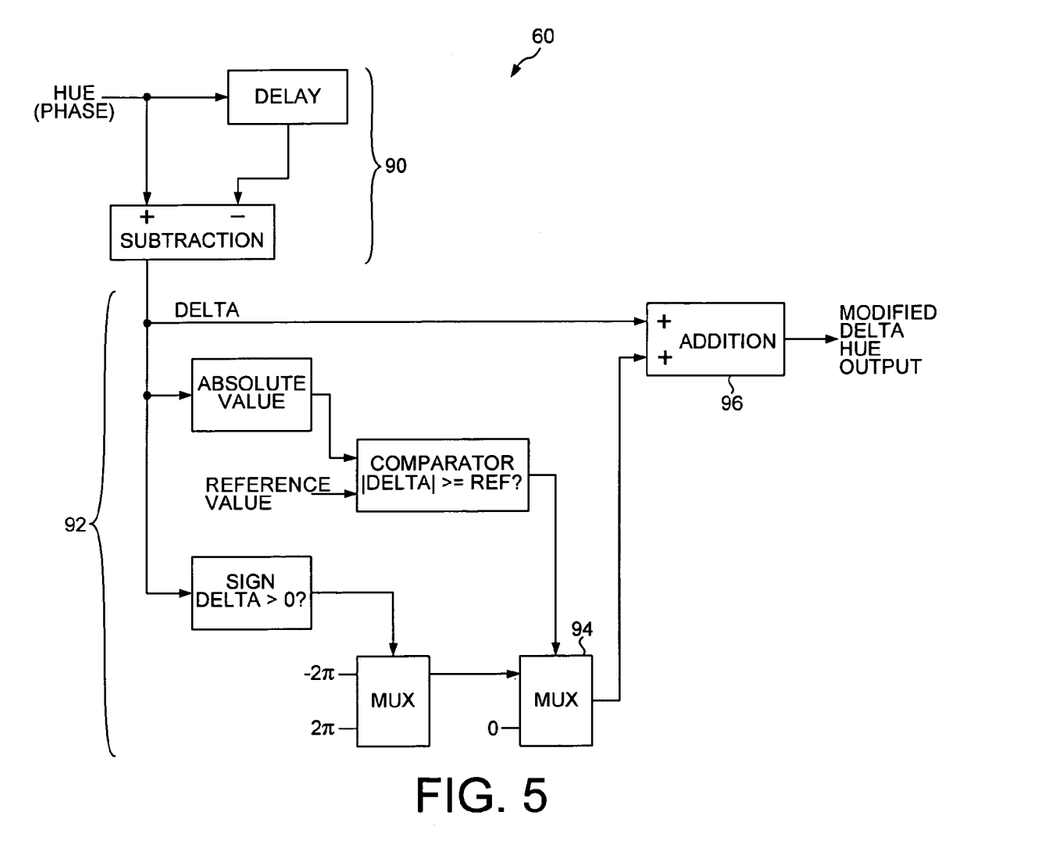
FIG. 5 is a digital phase circuitry for use with the filter of FIG. 4.

The main input and correction input in FIG. 2 are both differential inputs. As shown in FIGS. 4–5, a differential input filter allows the improved differential hue circuitry of FIG. 5 to be used.

Figure 3:
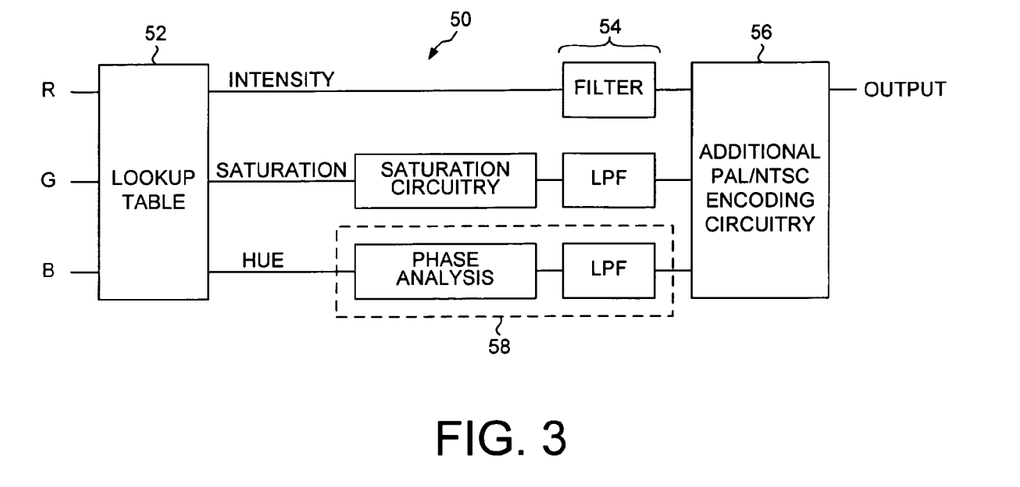
FIG. 3 is a diagram of an encoder for a video signal.

FIG. 3 is a diagram of a video encoder 50 that uses the filter of the present invention. A lookup table 52 converts red/green/blue (RGB) pixel data into hue saturation and intensity values. These values are filtered in filters 54 and sent to the additional PAL/NTSC encoding circuitry 56. The additional PAL/NTSC encoding circuitry 56 uses the saturation and hue values to produce a chrominance subcarrier which is added to the intensity values to produce the video signal. The vertical and horizontal blanking interval, audio, and other information is added to the video signal. Circuitry 58, the phase analysis element and low-pass filter, includes an embodiment of the filter of the present invention.

FIG. 4 illustrates a preferred embodiment of the circuitry 50 of the present invention. The circuitry 50 includes differential phase circuitry 60, which converts the hue input into a differential phase output, along with the special filter 62 of the present invention. Also shown is the correction signal circuitry 64 used to produce the unfiltered correction signal for the filter 62.

A preferred embodiment of the differential phase circuitry 60 is shown in FIG. 5. The differential phase circuitry is also discussed and claimed in the co-pending application entitled "Reduction of Color Transition Distortions in NTSC/PAL Encoder" by inventor Anatoliy V. Tsyrganovich, now U.S. Pat. No. 5,995,164. Also incorporated by reference is the co-pending application "Dot Crawl Reduction in NTSC/PAL Graphic Encoder," by inventor Anatoliy V. Tsyrganovich, now U.S. Pat. No. 6,163,346.

Looking again at FIG. 4, the differential phase circuitry 60 produces a modified differential phase. A simple reconstruction of the hue using the modified differential phase produces a hue value having unbounded values. The correction signal circuitry 64 and filter 62 is used to provide boundaries for the hue signal. When the hue value on line 66 is greater than a high reference value, the comparator 68 controls multiplexer 70 to output a $-2\pi$ correction value on line 74. When the hue value on line 66 is less than a low reference value, comparator 72 controls multiplexer 70 to output a $2\pi$ correction value on line 74. If the hue value on line 66 is in between the high reference and the low reference values, the multiplexer 70 outputs zero as the correction value along line 74. In this manner, the hue output value is maintained within a desired boundary. In a preferred embodiment, the high reference value is $2\pi$ and the low reference value is zero. Thus, the hue output range only needs guard bands equal in width to the reference value discussed below with respect to the differential phase circuitry 60. Thus, in one embodiment, the guard bands range from $2\pi$ to $3\pi$ and 0 to $-\pi$ are used and the hue output is encoded within the range $3\pi$ to $-\pi$.

Note that the hue signal on line 66 is, in effect, an unfiltered reconstructed hue signal, since the differential hue, differential correction signal, and the last output of the addition circuitry 76a are added in addition circuitry 76a. The hue input is filtered, but the correction offset is not filtered. The correction offset does not pass through the input delay line but goes directly to the coefficient circuitry 76, 78 and 80.

FIG. 5 is a diagram of the differential phase circuitry 60. This circuitry 60 uses differential circuitry 90 to provide a differential or delta hue signal. This delta hue signal is modified in circuitry 92 to produce the modified delta hue output. The absolute value of the delta hue is compared to a reference value. If the absolute value of the delta hue is greater than a reference value, then a modified value is sent through multiplexer 94 to be added to the delta hue in adder 96 to produce the modified delta hue output.

Figure 6A:
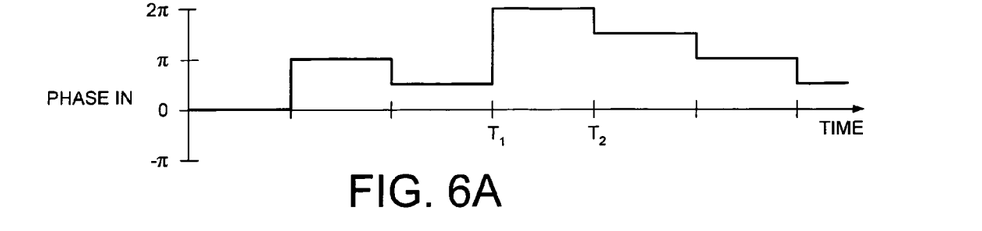
FIG. 6A is a graph of an input phase signal.
Figure 6B:
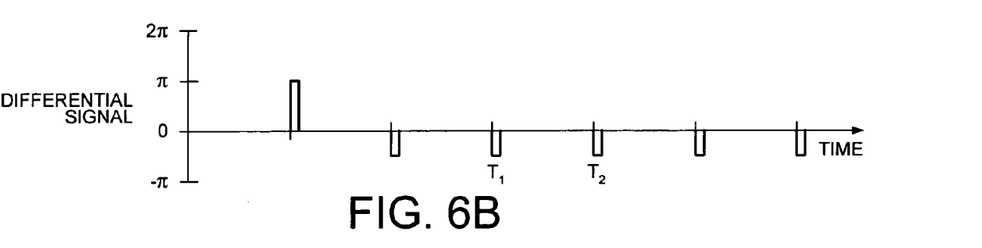
FIG. 6B is a graph of a differential phase signal.
Figure 6C:
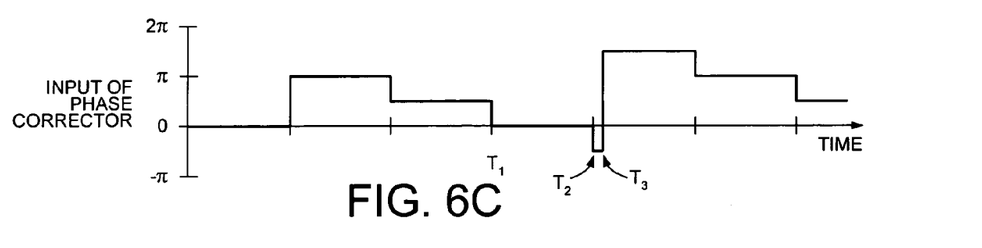
FIG. 6C is an input to the phase corrector circuitry.
Figure 6D:
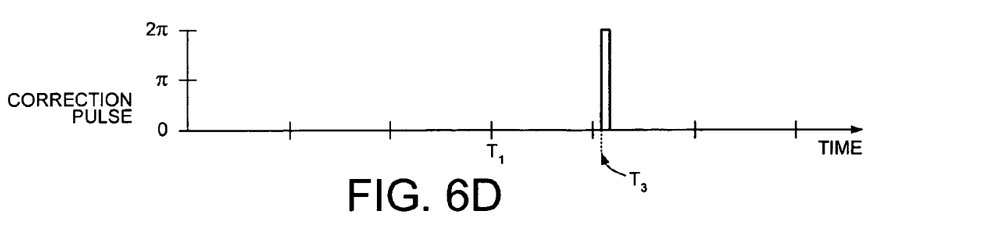
FIG. 6D is a graph of the correction pulse.

FIG. 6A is a graph of the phase in signal along line 61 of the differential phase circuitry 60 of FIG. 4. FIG. 6B is a graph of the differential signal output along line 63 of the differential phase circuitry 60 of FIG. 4. Note that at a time $T_1$, the phase input moves up $3/2\pi$ in FIG. 6A; however, the differential signal output drops down to produce a $-\frac{1}{2}\pi$ differential signal rather than a positive $3/2\pi$ differential signal. FIG. 6C shows the input of the phase corrector circuitry 64 at line 66 in FIG. 4. Note that, at time $T_1$, the phase corrector signal drops to zero rather than rising to $2\pi$; zero and $2\pi$ being equivalent phases. At time $T_2$, the phase signal at line 66 drops down to $-\frac{1}{2}\pi$. Since this is less than the low reference value, comparator 72 and multiplexer 70 cause a positive $2\pi$ correction pulse at time $T_3$, as shown in FIG. 6D.

Figure 6E:
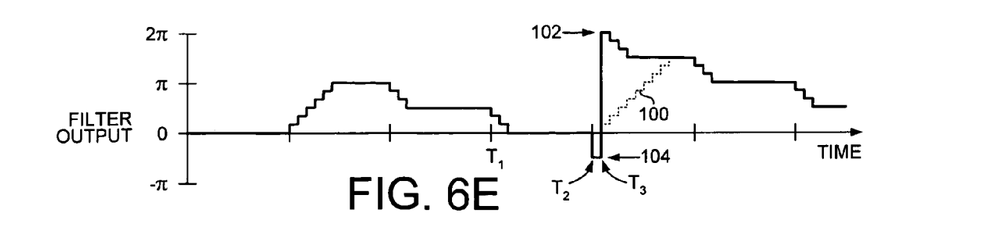
FIG. 6E is a graph of the filtered output of the circuit of the present invention.

FIG. 6E shows the filter output at line 87 of FIG. 4. Note that the filter acts as a low-pass filter to the input phase from line 66, as long as there is no correction pulse. At time $T_3$, a correction pulse is produced which is not filtered by the circuitry 62. The output jumps up to a corresponding value within the range 0 to $2\pi$, and continues low-pass filtering the transition. If the correction pulse component was filtered, as shown in phantom line 100, spurious values for the color of the pixel location would be produced. Note that the value 102 is an equivalent phase representation to the value 104 which is the filtered output that would be produced if there is no correction pulse.

Figure 7:
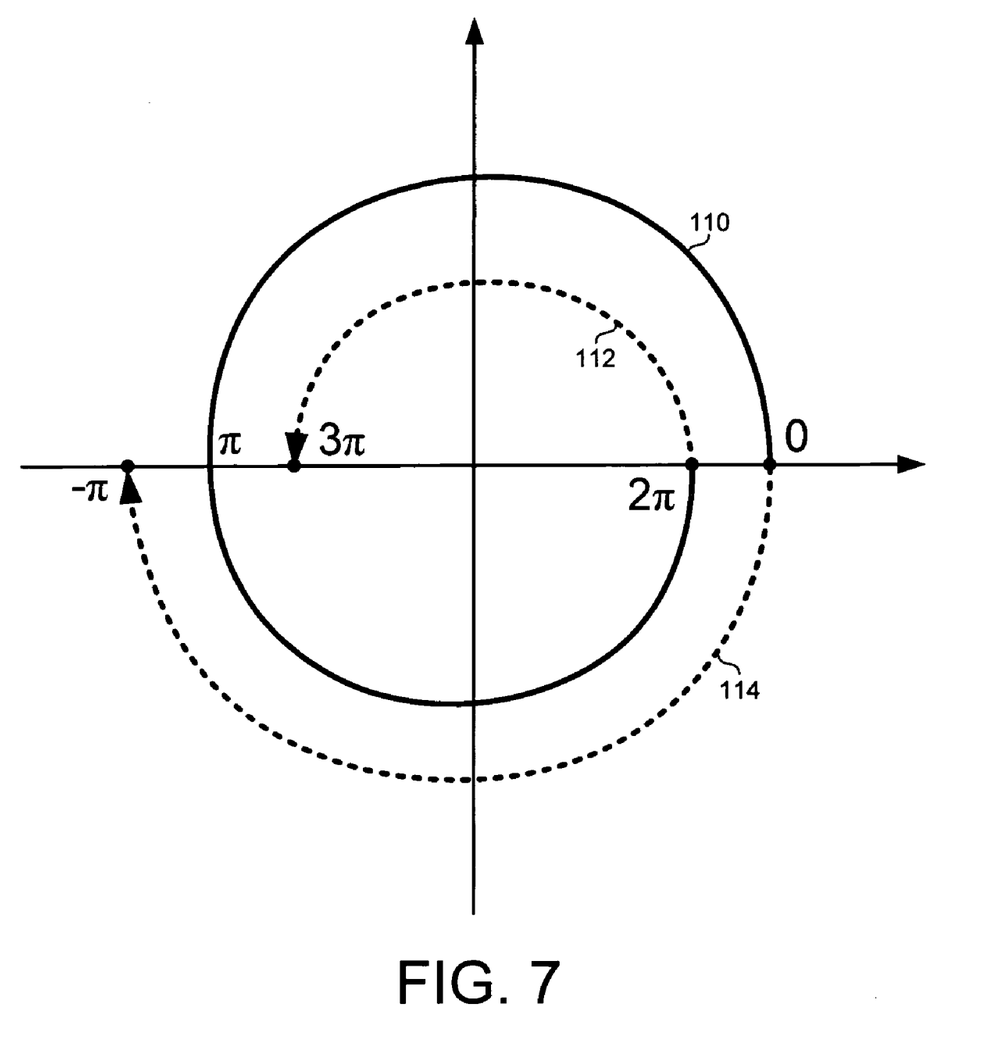
FIG. 7 is a graph of a circuit correction diagram in the polar representation.

FIG. 7 is a graph illustrating a circle correction for a virtual polar representation. As shown in FIG. 7, there is a main phase range 110 from zero to $2\pi$. Guard band 112 ranges from $2\pi$ to $3\pi$, and guard band 114 ranges from 0 to $-\pi$. Note that the values in the guard bands 112 and 114 correspond to values within the main range 110, thus allowing a positive or negative $2\pi$ jump onto the main phase range 110.

Figure 8:
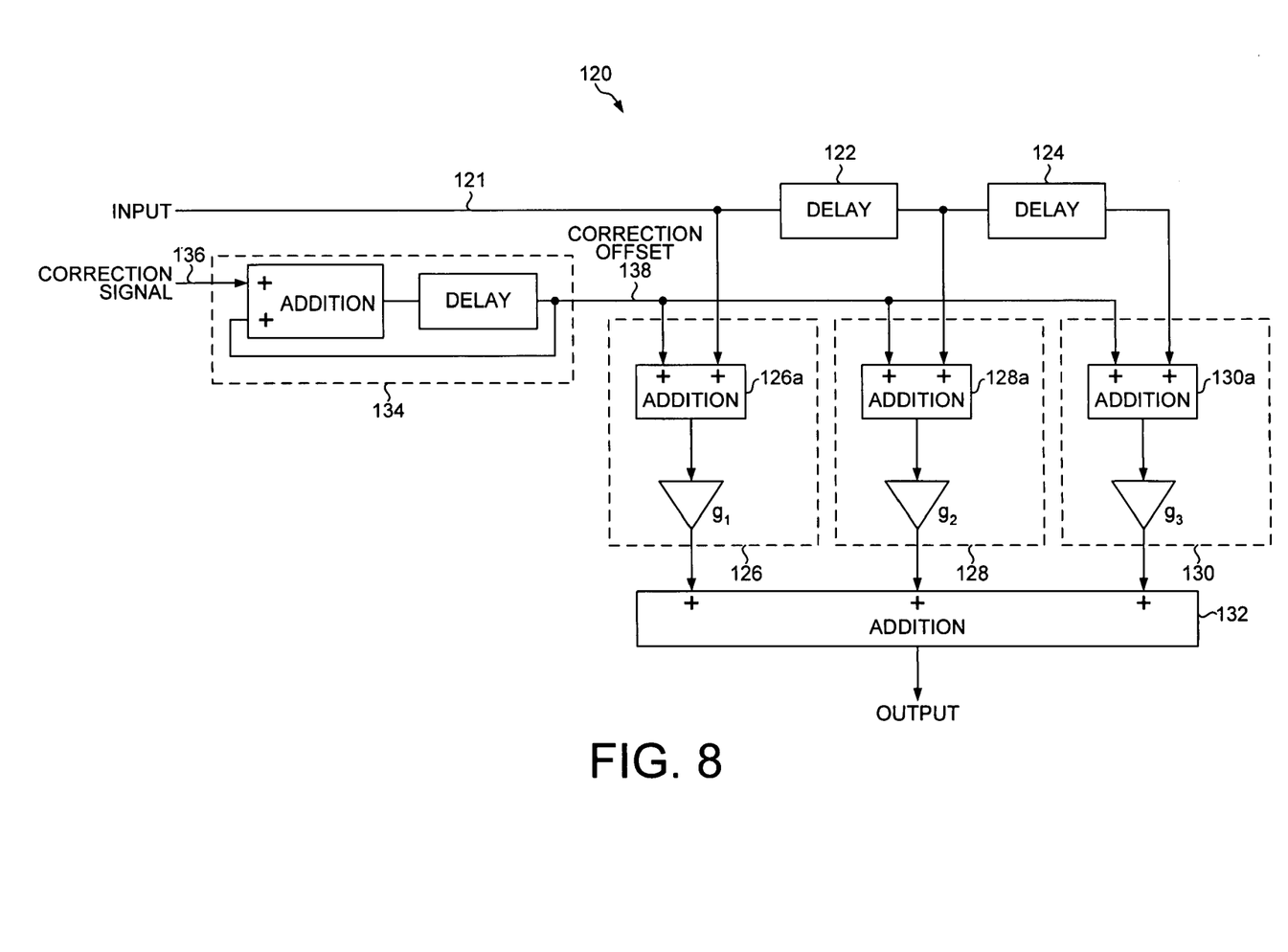
FIG. 8 is a diagram of an alternate embodiment of the digital filter of the present invention.

FIG. 8 is an alternate embodiment of the filter of the present invention. This alternate embodiment of the filter 120 includes the delay lines 122 and 124, coefficient circuitry 126, 128 and 130, summer 132 and the integration circuitry 134. Integration circuitry 134 converts the differential correction signal at point 136 to a correction offset level at point 138. The adder 126a, 128a and 130a adds the correction offset 138 with the output of the delay line including delays 122 and 124. The correction offset 138 is not filtered, while the input at line 121 is filtered. The output can be given by the equation $$\text{output}(n) = g_1(\text{input}(n)+\text{offset}(n)) + g_2(\text{input}(n-1)+\text{offset}(n)) + g_3(\text{input}(n-2)+\text{offset}(n))$$

which reduces to $$\text{output}(n) = g_1\text{input}(n) + g_2\text{input}(n-1) + g_3\text{input}(n-2) + g_t\text{offset}(n)$$

where $$g_t = g_1 + g_2 + g_3$$

When $g_t$ is equal to 1, the output of the filter of FIG. 8 is equal to the filtered input value on 121 plus the offset value at 138.

Various details of the implementation and method are merely illustrative of the invention. It will be understood that various changes in such details may be within the scope of the invention, which is to be limited only by the appended claims.

What is claimed is:

1. A circuit comprising:
   a first circuit portion connected to a first input, the first circuit portion including at least one delay element; and a second circuit portion attached to the first circuit portion, the second circuit portion including at least one delayed signal input from the at least one delay element, and an adjustment input, the adjustment input not passing through the at least one delay element, wherein when there is no adjustment input, the circuit acts as a filter, and wherein the adjustment input changes the level of the output without the adjustment signal being filtered, wherein the second circuit portion includes at least one coefficient circuit connected to one of the at least one delayed signal input and to the adjustment input, and wherein the output of the at least one coefficient circuit is to a second delay element and the output of the second delay element is sent to the at least one coefficient circuit.

2. A circuit comprising:
a first circuit portion connected to a first input, the first circuit portion including at least one delay element; and
a second circuit portion attached to the first circuit portion, the second circuit portion including at least one delayed signal input from the at least one delay element, and an adjustment input, the adjustment input not passing through the at least one delay element, wherein when there is no adjustment input, the circuit acts as a filter, and wherein the adjustment input changes the level of the output without the adjustment signal being filtered, wherein the second circuit portion includes at least one coefficient circuit connected to one of the at least one delayed signal input and to the adjustment input, and wherein the coefficient circuit includes an input summer and a gain amplifier having a gain.

3. A circuit comprising:
a first circuit portion connected to a first input, the first circuit portion including at least one delay element; and
a second circuit portion attached to the first circuit portion, the second circuit portion including at least one delayed signal input from the at least one delay element, and an adjustment input, the adjustment input not passing through the at least one delay element, wherein when there is no adjustment input, the circuit acts as a filter, and wherein the adjustment input changes the level of an output without the adjustment signal being filtered, wherein the first input and the output are phase representations, and wherein the adjustment input causes an integer multiple of $2\pi$ shift in the output signal.

4. A circuit comprising:
a first circuit portion connected to a first input, the first circuit portion including at least one delay element; and
a second circuit portion attached to the first circuit portion, the second circuit portion including at least one delayed signal input from the at least one delay element, and an adjustment input, the adjustment input not passing through the at least one delay element, wherein when there is no adjustment input, the circuit acts as a filter, and wherein the adjustment input changes the level of the output without the adjustment being filtered; and
adjustment control logic adapted to provide the adjustment input, wherein the adjustment control logic is adapted to produce a minus $2\pi$ adjustment signal if a tested signal is greater than a positive reference value and produce a positive $2\pi$ adjustment signal if the tested signal is less than a negative reference value.

5. A circuit comprising:
a digital filter including input lines giving signal values at different time indexes, gain amplifier circuitry adapted to multiply the signal values by filter coefficients, and a summer connected to the gain amplifier circuitry to produce an output value; and
summing circuitry connected to the input lines of the signal values at different time indexes and to an adjustment input, wherein the output of the summing circuitry is sent to the gain amplifier circuitry.

6. A method comprising:
providing a circuit;
inputting an input signal into the circuit such that the circuit filters the input signal to provide a filtered component to the output of the circuit;
inputting an adjustment signal into the circuit so that the adjustment signal provides an unfiltered offset that is added to the output;
adding the adjustment signal to the input signal to provide delayed output signal; and
adding the delayed output signal to the adjustment signal and the input signal.

7. The method of claim 6, wherein the adjustment signal keeps the output within a preset range.

8. The method of claim 6, wherein the filtering of the input signal is a low-pass filtering.

9. The method of claim 6, wherein the input is a phase signal.

10. The method of claim 6, wherein the input is a hue signal.

11. A method comprising:
constraining a phase signal within a finite preset range, the constraining step including adding a correction signal to the phase signal to produce an output;
adding a delay to the output;
feeding back the delayed output so that it is added to the correction signal and the phase signal; and
filtering the phase signal without filtering the correction signal portion of the phase signal.

12. The method of claim 11, wherein the filtering of the modified phase signal is a low-pass filtering.

13. The method of claim 11, wherein the constraining step is such that the phase signal is processed so as to use a differential input.

14. The method of claim 11, wherein the phase signal is a hue signal.

15. A method comprising:
constraining a phase signal within a preset range, the constraining step including adding a correction signal to the phase signal; and
filtering the phase signal without filtering the correction signal portion of the phase signal, wherein the correction signal is an integer multiple of $2\pi$.

16. A method comprising:
constraining a phase signal within a preset range, the constraining step including adding a correction signal to the phase signal; and
filtering the phase signal without filtering the correction signal portion of the phase signal, wherein the preset range is zero to $2\pi$.

17. A method comprising:
constraining a phase signal within a preset range, the constraining step including adding a correction signal to the phase signal; and
filtering the phase signal without filtering the correction signal portion of the phase signal, wherein the preset range is zero to $2\pi$ plus a guard band.

18. The method of claim 17, wherein the guard band is a reference value above or below the range zero to $2\pi$.

19. The method of claim 18, wherein the guard bands are $-\pi$ to zero and $2\pi$ to $3\pi$.

20. A method comprising:
constraining a phase signal within a preset range, the constraining step including adding a correction signal to the phase signal; and
filtering the phase signal without filtering the correction signal portion of the phase signal, wherein the constraining step is such that the phase signal is processed so as to use a differential input, and wherein the differential input is offset by an integer multiple of $2\pi$ so as to reduce the absolute value of the differential input.

21. An apparatus comprising:
circuitry to constrain a phase signal within a finite preset range using a correction signal, wherein the correction signal is an integer multiple of $2\pi$, and
a filter adapted to filter the phase signal without filtering the correction signal contribution, and to add the correction signal to the phase signal.

22. An electronic circuit comprising:
a delay which receives an input signal and outputs a delayed input signal;
a first adder which outputs a first corrected signal by adding a correction signal to the input signal;
a second adder which outputs a second corrected signal by adding the correction signal to the delayed input signal; and
a third adder which outputs an output signal by adding the first corrected signal and the second corrected signal.

23. A circuit comprising:
a first circuit portion connected to a first input, the first circuit portion including at least one delay element; and
a second circuit portion attached to the first circuit portion, the second circuit portion including at least one delayed signal input from the at least one delay element, and an adjustment input, the adjustment input not passing through the at least one delay element, wherein when there is no adjustment input, the circuit acts as a filter, and wherein the adjustment input changes the level of the output without the adjustment being filtered; and
adjustment control logic adapted to provide the adjustment input, wherein the adjustment control logic is adapted to produce a minus $2\pi$ adjustment signal if a tested signal is greater than a first reference value and produce a positive $2\pi$ adjustment signal if the tested signal is less than a second reference value.

24. A circuit comprising:
a first circuit portion connected to a first input, the first circuit portion including at least one delay element;
a second circuit portion attached to the first circuit portion, the second circuit portion including at least one delayed signal input from the at least one delay element, and an adjustment input, the adjustment input not passing through the at least one delay element, wherein when there is no adjustment input, the circuit acts as a filter, and wherein the adjustment input changes the level of the output without the adjustment being filtered; and
adjustment control logic adapted to provide the adjustment input, wherein the adjustment control logic is adapted to produce a positive $2\pi$ adjustment signal if a tested signal is greater than a first reference value and produce a minus $2\pi$ adjustment signal if the tested signal is less than a second reference value.

25. A method comprising:
providing a first circuit portion connected to a first input, the first circuit portion including at least one delay element;
providing a second circuit portion attached to the first circuit portion, the second circuit portion including at least one delayed signal input from the at least one delay element, and an adjustment input, the adjustment input not passing through the at least one delay element, wherein when there is no adjustment input, the circuit acts as a filter, and wherein the adjustment input changes the level of the output without the adjustment being filtered; and
providing an adjustment input to produce a minus $2\pi$ adjustment signal if a tested signal is greater than a first reference value and produce a positive $2\pi$ adjustment signal if the tested signal is less than a second reference value.

26. A method comprising:
providing a first circuit portion connected to a first input, the first circuit portion including at least one delay element;
providing a second circuit portion attached to the first circuit portion, the second circuit portion including at least one delayed signal input from the at least one delay element, and an adjustment input, the adjustment input not passing through the at least one delay element, wherein when there is no adjustment input, the circuit acts as a filter, and wherein the adjustment input changes the level of the output without the adjustment being filtered; and
providing an adjustment input to produce a positive $2\pi$ adjustment signal if a tested signal is greater than a first reference value and produce a minus $2\pi$ adjustment signal if the tested signal is less than a second reference value.

* * * * *

UNITED STATES PATENT AND TRADEMARK OFFICE
CERTIFICATE OF CORRECTION

PATENT NO. : 7,139,037 B1  Page 1 of 1
APPLICATION NO. : 08/937877
DATED : November 21, 2006
INVENTOR(S) : Anatoliy V. Tsyrganovich It is certified that error appears in the above-identified patent and that said Letters Patent is hereby corrected as shown below:

Column 6, line 16, the word --a-- should be added to the end of the line after the word "provide".

Claim 6, lines 16-17 should read:

--adding the adjustment signal to the input signal to provide a
    delayed output signal; and--

Column 7, line 17, a semicolon should replace the comma before the word "and" at the end of the line.

Claim 21, lines 15-17 should read:

--circuitry to constrain a phase signal within a finite preset
    range using a correction signal, wherein the correction
    signal is an integer multiple of $2\pi$; and--

Signed and Sealed this

Thirtieth Day of January, 2007

JON W. DUDAS
*Director of the United States Patent and Trademark Office*